March 18, 1952 — E. P. KINNE — 2,589,264
DRAFT CONNECTION
Filed March 18, 1946 — 3 Sheets-Sheet 1
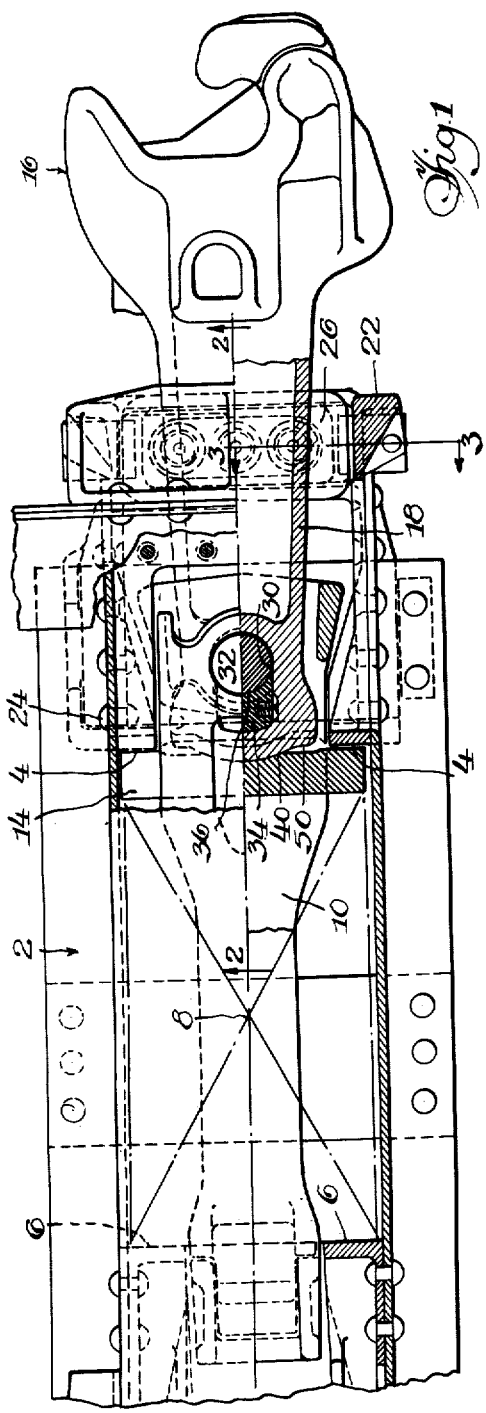
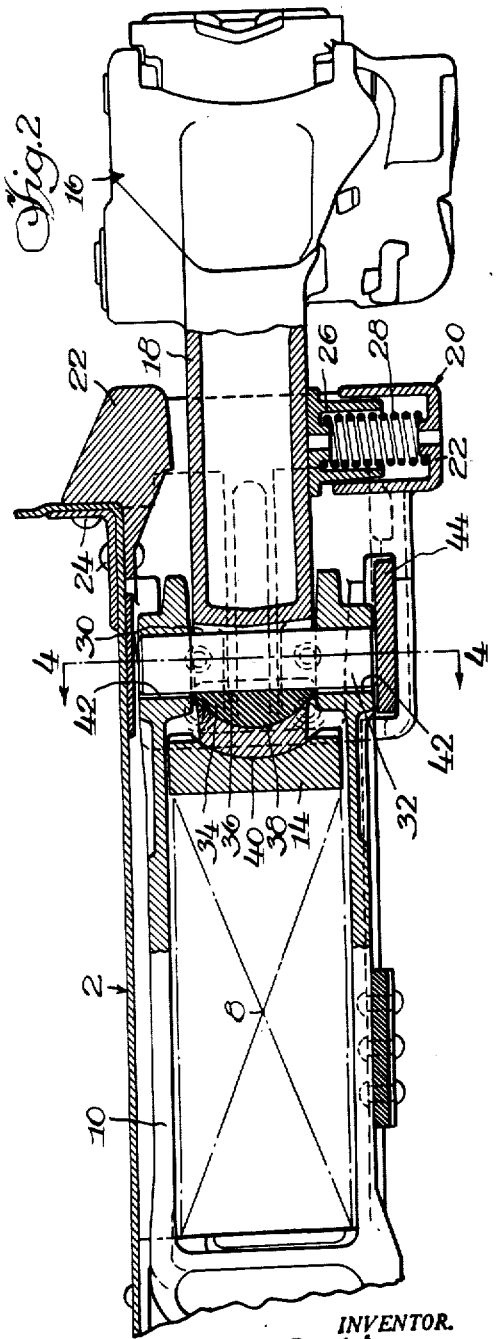
INVENTOR.
Edmund P. Kinne March 18, 1952 E. P. KINNE 2,589,264
DRAFT CONNECTION
Filed March 18, 1946 3 Sheets-Sheet 2
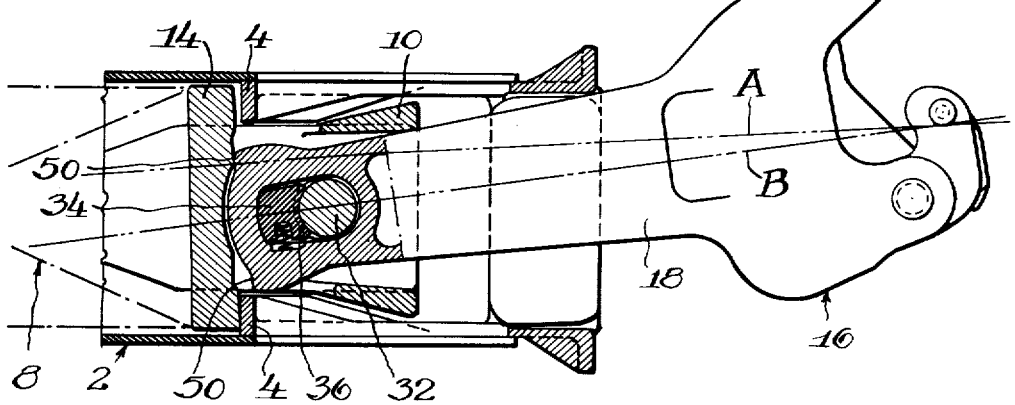
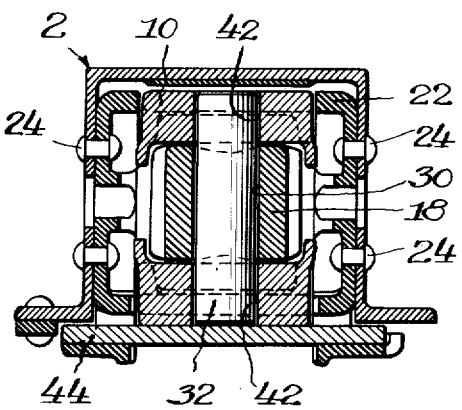
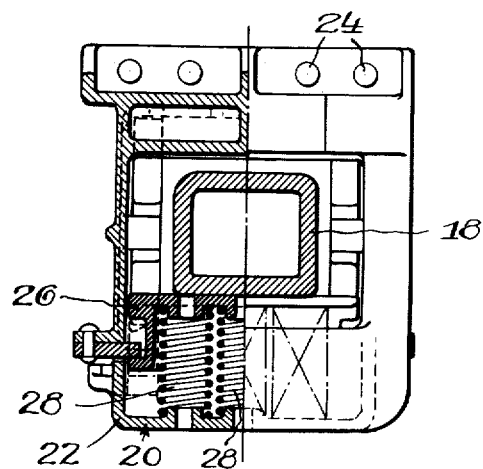
INVENTOR.
Edmund P. Kinne
BY
Arm O. B. Garner
Atty.

March 18, 1952  E. P. KINNE  2,589,264
DRAFT CONNECTION

Filed March 18, 1946  3 Sheets-Sheet 3

INVENTOR.
Edmund P. Kinne
BY
Atty.

Patented Mar. 18, 1952

2,589,264

UNITED STATES PATENT OFFICE 2,589,264

DRAFT CONNECTION

Edmund P. Kinne, Alliance, Ohio, assignor to American Steel Foundries, Chicago, Ill., a corporation of New Jersey Application March 18, 1946, Serial No. 655,145

11 Claims. (Cl. 213—72)

This invention relates to couplers and more particularly to a novel improved coupler construction for railway cars.

A general object of the invention is to design a novel two-piece coupler structure in which the coupler head is rigidly connected to a shank which is pivoted to the coupler yoke to afford angling of the shank with respect to said yoke, means being provided to freely accommodate limited horizontal or lateral angling of the coupler shank and to prevent jack-knifing of the two-piece coupler structure during extreme horizontal angling of the shank.

Another object of the invention is to provide a novel pivotal connection between the coupler shank and the coupler yoke wherein the shank is provided with a pin opening and a pin bearing block mounted therewithin for arcuate face engagement with the pin and the shank, thereby accommodating vertical and horizontal angling of the coupler shank while maintaining a relatively snug connection between the shank and the pin, means being provided for maintaining the pin bearing block in assembled relationship with the coupler shank during assembly and disassembly thereof with respect to the yoke portion of the two-piece coupler structure.

A different object of my invention is to devise a swivel coupler arrangement wherein a resilient spring carrier may be provided for supporting a head of the coupler adjustably arranged to position the height of the coupler and to hold it level while permitting horizontal angling.

A more specific object of my invention is to devise such a coupler and draft arrangement in which a special follower may be provided intermediate the shank end of the coupler and the associated draft gear, said follower having a spherical central portion for complementary engagement with the butt end of the coupler and having at each side of said spherical face radial faces vertically arranged for engagement with complementary faces at opposite sides of the butt end of the coupler in order to permit satisfactory vertical, as well as lateral, angling as hereinafter more particularly described.

The foregoing and other objects and advantages of the invention will become apparent from a consideration of the following specification and the accompanying drawings, wherein:

Figure 1 is a top plan view of the novel device as applied to a standard railway car, portions of the structure being shown in horizontal section;

Figure 2 is a side elevation of the structure shown in Figure 1 with a portion of the structure illustrated in central vertical section, as indicated by the line 2—2 of Figure 1;

Figure 3 is a vertical sectional view taken in the plane indicated by the line 3—3 of Figure 1;

Figure 4 is a vertical sectional view taken in the plane indicated by the line 4—4 of Figure 2; and Figure 5 is a fragmentary top plan view of the structure shown in the preceding figures, portions thereof being illustrated in horizontal section and the coupler head being illustrated in a position of extreme horizontal or lateral angling.

Figure 6:
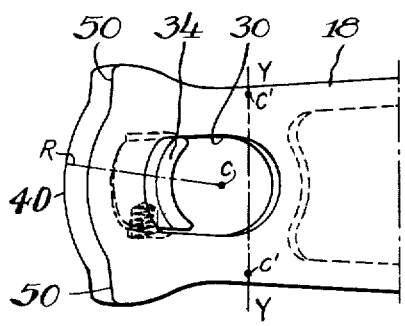
Figure 7:
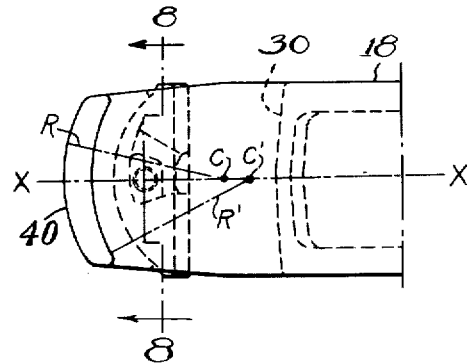
Figure 8:
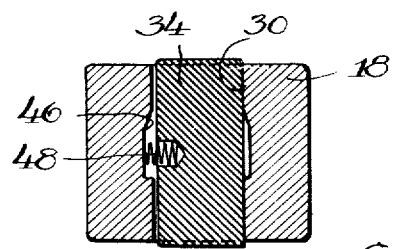

Figures 6–8 inclusive illustrate in detail the manner in which the coupler bearing block is mounted within the coupler shank, Figure 6 being a fragmentary top plan view of the shank with the bearing block applied thereto, Figure 7 being a side elevation of the structure shown in Figure 6, and Figure 8 being a sectional view taken in the vertical plane indicated by the line 8—8 of Figure 7.

Describing the invention in detail and referring first to Figures 1–4, the invention is illustrated as applied to a standard car body 2 comprising front and rear draft lugs 4 and 6 (Figure 1) adapted to engage a conventional draft gear diagrammatically indicated at 8 (Figures 1, 2 and 5). The draft gear is housed within a yoke 10, said draft gear being in engagement with a special follower 14 normally adapted to abut the front draft lugs 4. It will be understood that under normal conditions the draft gear 8 bears at its rear extremity against the rear draft lugs 6, 6. However, under pulling conditions the draft gear may be compressed and may become disengaged from the rear draft lugs 6, 6.

The coupler generally designated 16 comprises a shank 18 supported by a carrier generally designated 20 (Figures 2 and 3). The carrier comprises a casting 22 mounted as at 24 on the car body 2, the front draft lugs 4 being preferably formed on said casting. A carrier plate 26 is supported by springs 28 mounted on the casting 22, and the carrier plate 26 engages the shank 18 to afford a resilient support therefor, the shank 18 being slidable against the plate 26 during horizontal or lateral angling of the shank, as hereinafter described.

The shank 18 adjacent the rear extremity thereof is provided with a pin opening 30 receiving a pivot pin 32 and a pin bearing block 34 in complementary arcuate face engagement at 36 (Figures 1, 2 and 5) with a pin 32 and in complementary arcuate face engagement at 38 (Figure 2) with the coupler shank which is in spherical face engagement as at 40 (Figures 1 and 2) with the follower 14 along complementary convex, concave surfaces. The pin is received within openings 42 through the yoke and is supported by a retainer plate 44 (Figures 1 and 4). Thus the yoke 10 affords a pocket for the rear end of the coupler shank 18 which bears against the follower 14, which may be regarded as the rear wall of the pocket.

It will be understood that during horizontal or lateral angling of the coupler shank 18, the bearing block 34 slides as at 36 against the pin 32 and the shank 18 slides as at 40 against the follower 14. The pin 32, under these conditions, may be rotated to some extent by friction developed at 36. During vertical angling of the shank 18, the shank slides as at 38 and 40 against the block 34 and the follower 14 respectively.

Referring now to Figures 6 and 8 which illustrate in detail the mounting of the bearing block 34 within the pin opening 30 in the shank 18, it will be seen that the shank 18 is recessed as at 46 (Figure 8) within the opening 30 to afford a pocket for a spring 48 which urges the block 34 laterally within the opening 30, thereby maintaining the block 34 in assembled relationship within said opening during assembly and disassembly of the shank 18 and yoke 10. In this connection it may be noted that the recess at 46 is so shaped as to accommodate sliding of the spring 48 against the shank 18 during vertical angling of the latter with respect to the pin 32, as above described.

It will be understood that the coupler shank 18 and the yoke 10 form a two-piece coupler structure, the front piece 18 of which may angle laterally without the objectionable jack-knifing tendency which is peculiar to the present pivoted coupler now termed the A. A. R. alternate standard swivel butt coupler.

This jack-knifing tendency is avoided by the manner in which the coupler shank 18 engages the follower 14 as the coupler 16 angles toward the extreme lateral or horizontal position thereof. In this connection it may be noted that the shank is formed on its rear surface with spaced abutment faces 50, 50 adapted for engagement respectively with complementary surfaces on the follower 14 during extreme lateral or horizontal angling of the coupler 16 as shown in Figure 5 wherein the face 50 at one side of the coupler shank 18 is engaged with the follower 14 to urge the latter from its abutment with one of the front draft lugs 4 thereby preventing the above-mentioned jack-knifing action between the shank 18 and the yoke 10. The faces 50, 50, as best seen in Figures 6 and 7, are vertically arcuate to accommodate vertical angling of the coupler when either of the faces 50, 50 is engaged with the follower 14. It will be understood that the engagement of the follower 14 with the front draft lugs 4, under normal conditions as shown in Figures 1 and 2, prevents the application of substantial pressure to the shank 18 through the surfaces at 40, thus accommodating lateral angling of the coupler without development of substantial friction at 40. By means of this arrangement the coupler 16 is permitted to freely angle laterally until the shank 18 approaches the extreme position shown in Figure 5, whereupon the shank is engaged at 50 with the follower 14 which is engaged with the front end of the draft gear, thereby resisting extreme lateral angling of the coupler 16 and preventing the above-mentioned jack-knifing action between the shank 18 and the yoke 10. The contact between the face 50 and the follower 14 is effective to reduce the angle of pushing force between adjacent cars so that there is less tendency for the cars to be forced apart laterally thereof with resultant coupler jack-knifing. Thus, referring to Figure 5, it will be seen that in my novel structure the line of buffing force between adjacent cars during a coupling operation is indicated at A, whereas this line of force would be that indicated at B except for the contact between the face 50 and the follower 14, which thus reduces the tendency for the cars to be forced apart laterally thereof, as will be clearly understood by those skilled in the art.

As best seen in Figures 6 and 7, the spherical bearing surface 40 of the coupler shank 18 is formed on a radius R from a center C which is disposed on the longitudinal axis of the shank and is thus intersected by the horizontal center plane X—X (Figure 7) of the shank. The abutments 50, which are approximately linear in horizontal cross section are formed in vertical cross section as cylindrical segments on radii $R^1$ from centers $C^1$, respectively, which are also intersected by the plane X—X. The radii $R^1$ are preferably approximately equal in length to the radius R. The centers $C^2$ are also preferably in a vertical plane Y—Y (Figure 6) approximately normal to the plane X—X and to the longitudinal axis of the shank.

This novel shank configuration accommodates vertical angling thereof in any position of the shank without compressing the draft gear 8 by such vertical angling, and also accommodates limited horizontal angling of the shank without compressing the draft gear 8 by such limited horizontal angling which facilitates coupling under all normal conditions as, for example, on curved or tangent track.

It is to be understood that I do not wish to be limited by the exact embodiment of the device shown which is merely by way of illustration and not limitation as various and other forms of the device will, of course, be apparent to those skilled in the art without departing from the spirit of the invention or the scope of the claims.

I claim:

1. In a coupler mounting, a car body comprising spaced front and rear abutment means, a draft gear assembly intermediate said spaced means and comprising a draft gear engaging the rear abutment means and a follower compressed between said gear and said front abutment means, a yoke housing said assembly, a coupler comprising a coupler shank, means pivotally interconnecting said yoke to said shank, said last-mentioned means comprising means accommodating vertical and horizontal angling of said shank relative to said yoke, said shank being in complementary spherical face engagement at its rear extremity with the forward face of said follower along segmental spherical areas formed on a radius from a center on the longitudinal axis of the shank, and buffing means at each side of the longitudinal axis of said shank spaced from the said follower when the shank is in level, horizontally centered position, and engageable with said follower under buffing conditions during extreme horizontal angling of said shank relative to said yoke, whereby said follower is compressed against said gear, each of said buffing means comprising a surface fixed with respect to the shank, approximately linear in horizontal cross section, and formed in vertical cross section as a segment of a cylinder on a radius from a center intersected by the horizontal center plane of the shank, whereby vertical angling of the shank in any horizontal position thereof is accommodated without compressing said assembly by such vertical angling.

2. In a coupler mounting for a car body comprising front and rear draft lugs, a draft gear assembly compressed between said lugs, said assembly comprising a member engaging the rear lug and another member engaging the front lug, a yoke housing said assembly, a coupler comprising a coupler shank, a vertical pivot pin extending through said yoke and said shank to afford a pivotal connection therebetween, said shank being in engagement with said other member along complementary spherical areas formed on a radius from a center on the longitudinal axis of the shank, whereby horizontal and vertical angling of said shank relative to said yoke is accommodated, and spaced buffing means at opposite sides of said shank spaced from said other member when the shank is in horizontally centered position and engageable with said other member during extreme horizontal angling of said shank to compress said assembly against said rear lug, each of said buffing means comprising a surface on the shank substantially linear in horizontal cross section and formed in vertical cross section substantially as a segment of a cylinder having a radius from a center approximately intersected by the horizontal center plane of the shank, the radii of respective surfaces being approximately intersected by a vertical plane normal to said axis.

3. In a coupler mounting, a car body comprising a pair of spaced rear draft lugs and a pair of spaced front draft lugs, a follower and a draft gear abutting the front and rear lugs respectively, said follower bearing against the forward end of said draft gear, a yoke housing said gear and said follower and extending between the lugs of each pair, said yoke abutting the rear end of said gear, a coupler shank, means pivoting said shank to said yoke, said means accommodating horizontal angling of said shank relative to said yoke, said shank being in complementary engagement with the forward surface of said follower along areas formed approximately as segments of spheres struck from a center on the longitudinal axis of the shank, and buffing means on each side of said shank for compressing said follower against said gear during extreme horizontal angling of said shank relative to said yoke, said buffing means being spaced from the follower when the shank is in level, centered position, each of said buffing means comprising a shank abutment substantially linear in horizontal cross section and formed in vertical cross section as a segment of a cylinder struck from a radius approximately intersected by the horizontal plane of the shank.

4. A coupler mounting comprising a car body, a draft gear engaged at its rear extremity with abutment means on said body, a follower engaged with the front extremity of said gear and engaged with abutment means on said body, a yoke housing said gear and follower and engaging the rear extremity of said gear at a point spaced from said first-mentioned abutment means, a coupler shank pivoted to said yoke and loosely engaging the forward surface of said follower along complementary spherical areas at a point spaced from said second-mentioned abutment means, said areas being struck from a center on the longitudinal axis of said shank, and buffing means on said shank spaced from said follower when the shank is in normal, level, centered position and engageable with said follower during extreme horizontal angling of said shank relative to said yoke whereby said follower is compressed against said gear, said buffing means comprising spaced rearwardly facing shank surfaces substantially linear in horizontal cross section and formed in vertical cross section as cylindrical segments struck from centers intersected by the horizontal center plane of the shank.

5. In combination, a car body with front and rear draft lugs, a coupler structure comprising a yoke portion and a coupler head with an integral shank portion pivotally connected to said yoke portion for vertical and horizontal angling relative thereto, a draft gear housed within said yoke portion in abutment with the rear lugs, a follower housed within said yoke portion and engaging said draft gear and the front lugs, said follower being in spherical face engagement with said shank portion along complementary spherical areas struck from a center on the longitudinal axis of the shank, and spaced rearwardly facing buffing surfaces at opposite sides of said shank portion adapted for engagement with said follower during extreme horizontal angling of said shank portion, said buffing surfaces being spaced from the follower when said shank portion is in normal, level, centered position relative to said yoke portion, each of said surfaces being substantially linear in horizontal cross section and being formed in vertical cross section as a segment of a cylinder struck from a center on the horizontal center plane of the shank.

6. In a coupler mounting for a car body having a compressible draft gear assembly mounted therein and having a yoke for said assembly; the combination of a coupler having a shank, means pivotally connecting said shank to said yoke for vertical and horizontal angling relative thereto, said shank having an inner extremity with a bearing surface engaging a complementary bearing face of said assembly, said bearing faces being formed substantially as segments of spheres on a radius from a common center lying substantially on the longitudinal axis of said shank, and spaced inwardly facing buffing surfaces carried by said shank at opposite sides of the face thereof, said surfaces being spaced from said assembly in horizontally centered position of the coupler to accommodate limited horizontal angling thereof without compressing said assembly by such limited horizontal angling, and said surfaces being substantially linear in horizontal cross section and being formed in vertical cross section as cylindrical segments on radii from centers substantially on the horizontal center plane of said shank, the surface radii being of approximately the same length as said radius to accommodate vertical angling of the coupler in any horizontally angled position thereof without compressing said assembly by such vertical angling, said surfaces being engageable with the assembly to compress the same upon horizontal angling of the coupler beyond said limited horizontal angling thereof.

7. In a coupler mounting for a car body having front and rear draft lugs; the combination of a draft gear between said lugs, a rear follower plate between said gear and the rear lugs, a front follower plate between said gear and the front lugs, a yoke surrounding said plates and gear, said yoke engaging the rear plate, a coupler having a shank, means pivotally connecting the shank to said yoke for horizontal and vertical angling relative thereto, complementary spherical bearing surfaces on the front plate and on the rear extremity of the shank, said surfaces being formed substantially as spherical segments on a radius from a center substantially on the longitudinal axis of the shank, said shank extremity having spaced, rearwardly facing abutments formed as substantially cylindrical segments on radii from centers lying substantially on the horizontal center plane of said shank, said front plate having buffing faces spaced from said abutments in horizontally centered position of the coupler whereby limited horizontal angling of the shank is accommodated without compressing said gear by such limited horizontal angling, said buffing faces being arcuate and approximately complementary in form to respective abutments to accommodate vertical angling of the shank in any position thereof without compressing said gear by such vertical angling, and each of said abutments being engageable with the related buffing face upon horizontal angling of the shank beyond said limiting horizontal angling thereof.

8. In a coupler mounting for a car body having a compressible draft assembly mounted therein and having a yoke for said assembly; the combination of a coupler with a shank, means pivotally connecting said shank to said yoke for vertical and horizontal angling relative thereto, said shank having an inner extremity with a bearing face engaging a complementary bearing face of said assembly, said bearing faces being formed substantially as segments of spheres, and spaced inwardly facing buffing surfaces on said shank at opposite sides of the face thereof, said surfaces being spaced from said assembly in horizontally centered position of the coupler to accommodate limited horizontal angling thereof without compressing said assembly by such limiting horizontal angling, and said surfaces being formed in vertical cross section as substantially cylindrical segments.

9. A coupler follower plate having an inner buffing surface on one side thereof for engagement with an associated draft gear, said plate having an outwardly facing concave bearing surface in its outer side formed substantially as a segment of a sphere having a radius from a center intersected by a horizontal plane, said surface being adapted to afford bearing for an associated complementary coupler shank surface, and a pair of outwardly facing abutment faces on said opposite side of said plate and disposed at opposite edges of said bearing surface, said faces being substantially linear in horizontal cross section and being formed in vertical cross sections as cylindrical segments having radii from centers approximately intersected by said plane, whereby said faces accommodate unrestricted vertical angling of said shank and limiting horizontal angling thereof.

10. In a follower for interposition between associated coupler and draft gear members of a draft arrangement; the combination of an inwardly facing draft gear bearing face on the inner surface of the follower, an outwardly facing recess in the outer surface of said follower, said recess being formed substantially as a segment of a sphere and being adapted to engage an associated coupler shank, and a pair of horizontally spaced, outwardly facing arcuate faces on said outer surface of the follower at diametrically opposite sides of said recess and bounding the same, said arcuate faces being substantially linear as seen in horizontal cross section and being formed in vertical cross section substantially as cylindrical segments.

11. A railway coupler having a head and a shank with a rear extremity formed substantially as a spherical segment struck on a radius from a center lying substantially on the longitudinal axis of the shank, said shank extremity having spaced rearwardly facing abutments formed as cylindrical segments on radii from centers substantially in the horizontal center plane of said shank, said radii being approximately equal in length to said radius and being substantially in a vertical plane passing between said head and said center approximately normal to said center plane.

EDMUND P. KINNE.

REFERENCES CITED

The following references are of record in the file of this patent:

UNITED STATES PATENTS

| Number | Name | Date |
|---|---|---|
| 829,731 | O'Connor | Aug. 28, 1906 |
| 1,215,315 | Willison | Feb. 6, 1917 |
| 1,498,540 | Coffin | June 24, 1924 |
| 1,608,386 | Goodwin | Nov. 23, 1926 |
| 2,003,221 | Regan et al. | May 28, 1935 |
| 2,019,311 | Kinne | Oct. 29, 1935 |
| 2,157,363 | Van Dorn | May 9, 1939 |
| 2,241,353 | Kinne et al. | May 6, 1941 |
| 2,251,982 | Card | Aug. 12, 1941 |
| 2,254,302 | Metzger | Sept. 2, 1941 |
| 2,454,514 | Kayler | Nov. 23, 1948 |